(12) United States Patent
Gonzalez

(10) Patent No.: US 10,779,673 B1
(45) Date of Patent: Sep. 22, 2020

(54) TAMALE MACHINE

(71) Applicant: Juan M. Gonzalez, McKinney, TX (US)

(72) Inventor: Juan M. Gonzalez, McKinney, TX (US)

(*) Notice: Subject to any disclaimer, the term of this patent is extended or adjusted under 35 U.S.C. 154(b) by 202 days.

(21) Appl. No.: 15/816,815

(22) Filed: Nov. 17, 2017

(51) Int. Cl.
*A21C 11/00* (2006.01)
*A47J 27/04* (2006.01)
*A47J 27/00* (2006.01)

(52) U.S. Cl.
CPC ............ *A47J 27/04* (2013.01); *A47J 27/002* (2013.01); *A47J 2027/043* (2013.01)

(58) Field of Classification Search
CPC ................................ A47J 27/04; A21C 11/163
See application file for complete search history.

(56) References Cited

U.S. PATENT DOCUMENTS

| | | | | |
|---|---|---|---|---|
| 1,947,932 A * | 2/1934 | Fante | ............... | A23G 9/288 211/85.4 |
| 3,424,076 A * | 1/1969 | Brady | ............... | A21B 5/08 99/416 |
| 4,309,450 A * | 1/1982 | Seibert | ............... | A23P 20/12 426/284 |
| 4,498,377 A * | 2/1985 | Smith | ............... | A21C 11/163 425/132 |
| 4,737,092 A * | 4/1988 | Bullick | ............... | A21C 11/16 425/142 |
| 5,052,593 A * | 10/1991 | Grome | ............... | A21C 11/18 222/333 |
| 5,195,424 A * | 3/1993 | Guajaca | ............... | A47J 27/04 126/348 |
| 5,198,239 A * | 3/1993 | Beavers | ............... | A21C 11/163 425/133.1 |
| 5,556,653 A * | 9/1996 | Binley | ............... | A23G 9/285 426/101 |
| 5,558,892 A * | 9/1996 | Pelka | ............... | A21C 11/18 116/172 |
| 6,187,358 B1 * | 2/2001 | Inoue | ............... | A21C 11/10 425/308 |
| 6,280,784 B1 * | 8/2001 | Yang | ............... | A21C 11/163 426/231 |
| 6,280,785 B1 * | 8/2001 | Yang | ............... | A21C 11/163 426/231 |
| 8,506,283 B1 * | 8/2013 | Gonzales | ............... | B30B 11/02 249/122 |
| D733,495 S * | 7/2015 | Tyson | ............... | D7/354 |

(Continued)

*Primary Examiner* — Lorne E Meade
*Assistant Examiner* — Lawrence H Samuels
(74) *Attorney, Agent, or Firm* — Kenneth L Tolar

(57) ABSTRACT

A food processing apparatus specifically a tamale preparing apparatus to prepare and cook tamales is disclosed. The tamale preparing apparatus comprises two sets of cartridges, a plunging system, a steamer forms, a steamer pot and a pot cover to prepare and cook tamales. The apparatus prepares tamales by inserting pre-cooked masa and fillings into cartridges. A plunging system helps to insert the pre-cooked masa and fillings from the cartridges into steamer forms. The steamer pot comprises a porous steamer tray to allow the steam of water to reach the tamales kept on the tray and helps in cooking of tamales. Parchment paper tubes are used to maintain the shape of the tamales while cooking in steam. The pot can cook numerous tamales at a time, reducing labor cost.

8 Claims, 11 Drawing Sheets

(56) References Cited

U.S. PATENT DOCUMENTS

| | | | | |
|---|---|---|---|---|
| D837,593 S | * | 1/2019 | Trudnak | D7/409 |
| 2011/0067580 A1 | * | 3/2011 | Branson | A47J 27/04 99/410 |
| 2011/0083563 A1 | * | 4/2011 | Branson | A47J 27/04 99/410 |

* cited by examiner

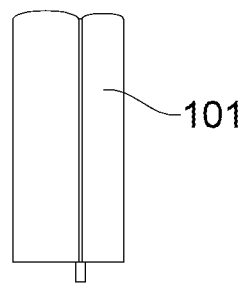
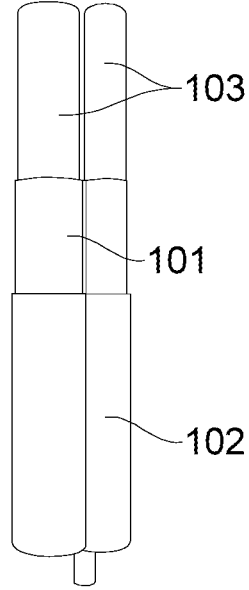
FIG. 2A
FIG. 2B
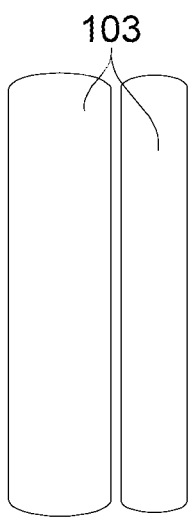
FIG. 2C

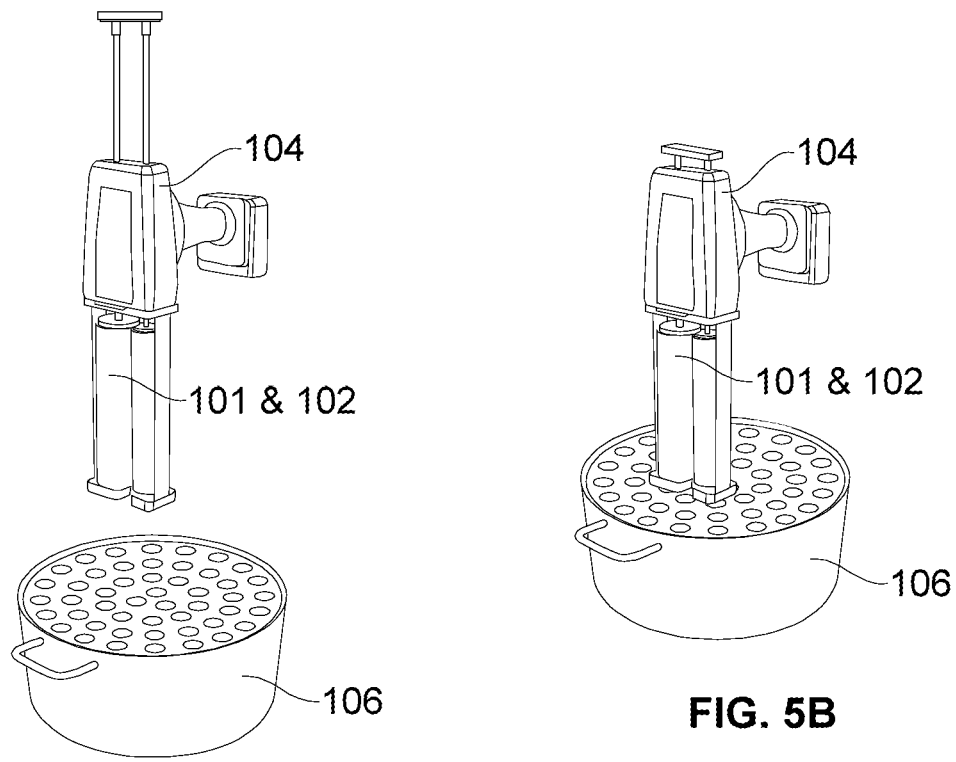
FIG. 5A
FIG. 5B
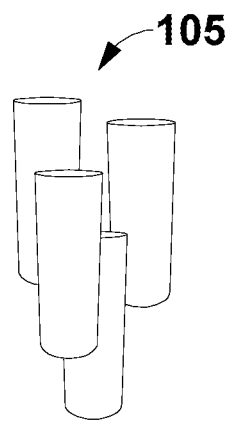
FIG. 5C

FIG. 9A  FIG. 9B

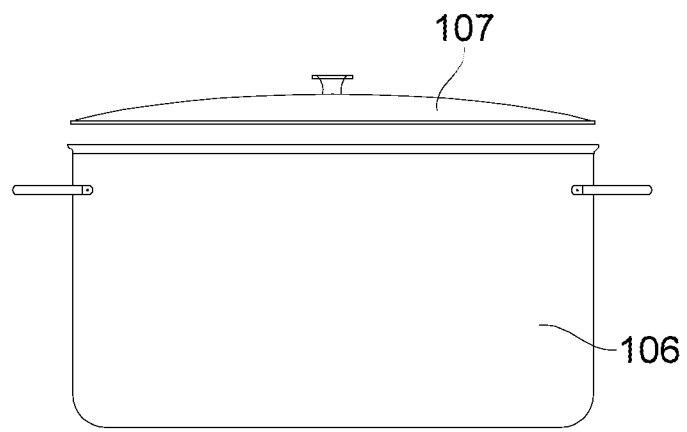
FIG. 10A
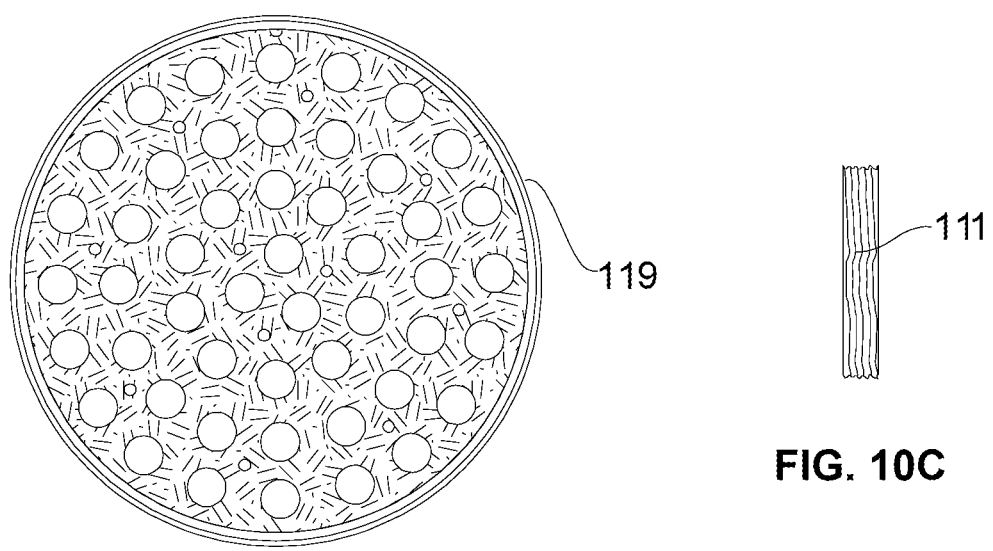
FIG. 10B
FIG. 10C

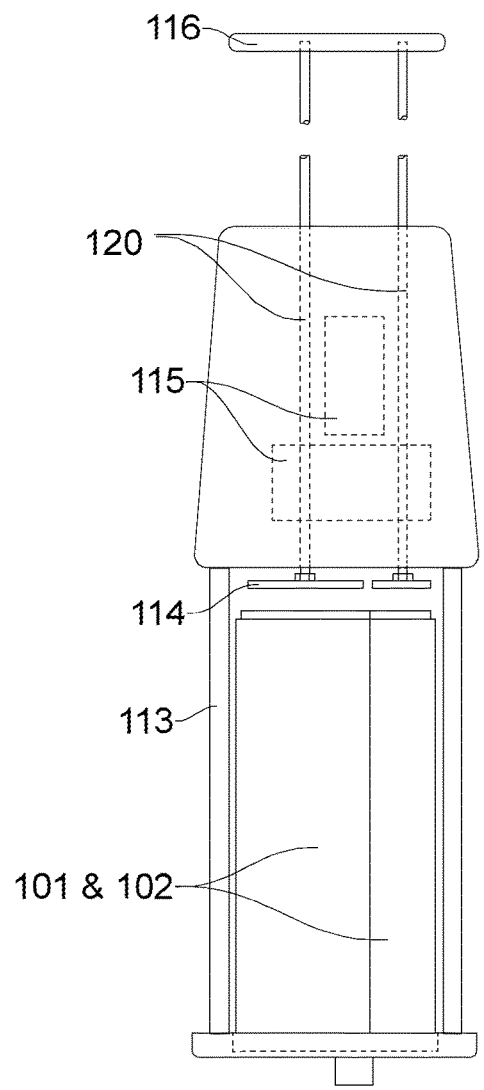
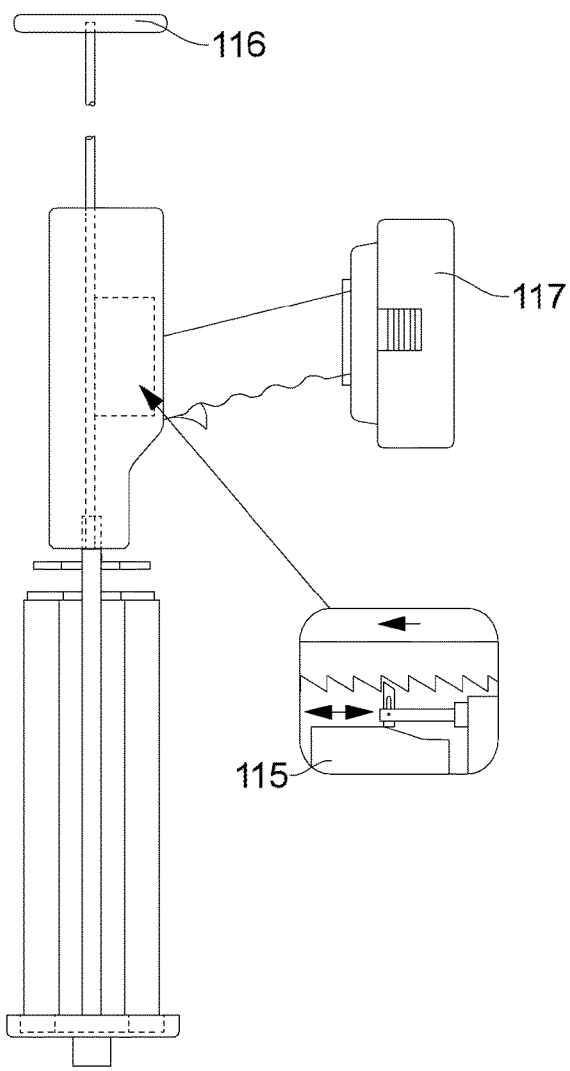
FIG. 11A  FIG. 11B

TAMALE MACHINE

BACKGROUND OF THE INVENTION

A. Technical Field

The present invention generally relates to a food processing apparatus. More specifically, the present invention relates to a food processing apparatus used for preparing tamales.

B. Description of Related Art

Tamale is a commonly used food source in the Americas for centuries and date back to before the pre-Columbian era. The Aztecs, Mayas, and other American civilizations have had their own version of the tamale. Tamales are used as easily portable food and found their way on hunting trips and traveling for these indigenous peoples. From a simple method of cooking corn, the thought of tamale has been originated somewhere in Central America.

The tamale is usually prepared from a dough derived from corn mix that is called masa. The masa is wrapped around with a filling that can vary from meat mixtures, cheeses, salsas, roasted peppers, or many other fillings. The fillings are a matter of preference for individual tastes. The entire tamale is wrapped in either a corn husk or plantain leaves to hold the product together for cooking. Cooking the tamale is done by steaming the tamale until the dough is firmed.

The traditional tamale is difficult to assemble and cook. Currently, the process of preparing tamales is a laborious process. The ingredients have to be sourced, typically from a Hispanic grocery store, and then laboriously processed to make the components. The corn husks must be soaked in water and prepared for filling. The corn husks are placed on the table/counter, the correct amount of masa (dough) placed on the corn husks, a piece of parchment paper placed over the masa, and the husks and masa pressed to achieve the optimum thickness. Then, the parchment paper is stripped off the masa, the pre-cooked meat or cheese filling is placed on the masa, the tamales rolled and folded using the 'diaper' fold. Further, the assembled tamales are placed in a steamer pan and heated until the masa is cooked. The tamales are plated, covered with picante or left plain, and served. Process of preparing this dish in a restaurant environment is too time consuming and makes them almost impossible to serve.

Therefore, there is a need for an apparatus and process for preparing tamale to minimize the labor cost, and make the process trouble-free. The tamale preparing apparatus is required to be available in both manual and automatic features for further convenience of the user. Further, there is also a need for a cooking appliance for bulk preparation of tamale whenever it is necessary.

SUMMARY OF THE INVENTION

The present invention generally relates to a food processing apparatus. More specifically, the present invention relates to a food processing apparatus used for preparing tamales. The invention discloses a device for preparing the tamales, and a steamer pot is provided in the invention for cooking the prepared tamales on steam.

In an embodiment, the tamale preparing apparatus comprises, two sets of cartridges, a plunging system, steamer forms, and steamer pot to make and cook tamales. The ingredients for tamale are inserted into the cartridges set to make tamales. In one embodiment, the ingredients inserted into the cartridges could be corn dough (masa) and pre-cooked meat or cheese or veggies or any combination thereof. The two cartridges nest together and allow the extrusion of the masa around the pre-cooked meat filling into the parchment paper tube.

In an embodiment, the plunging system consists of a plunger to manually extrude the tamale into the steamer forms. In another embodiment, the plunging system is used as an automatic tamale machine for dispensing the materials into the steamer forms. The plunger of the tamale gun is used to help the plunging system to dispense the materials from the cartridges. The tamale is extruded to the steamer forms in the steamer pots once the plunger is pressed down. In an embodiment, the steamer forms could be the shapers for tamales, when the tamales are kept inside the steamer pot for cooking.

In an embodiment, a plunging system could use plunger manually or automatically with battery. The internal and external cartridges could be filled with the poly tubes of masa and meat, and could be placed in the retention end of the tamale gun. The end is supported with stainless steel support rods. Further, stainless steel support rods are adhesively bonded in the plunger plate and gun receiver. The gun receiver consists of the solenoid driver that moves both the plunger rods simultaneously, keeping the plunger rods parallel. The masa and filling are dispensed using the trigger operated solenoid driver that advances the plunger plates into the cartridges.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 2A illustrates different cartridges and their arrangements, incorporating the aspects of the present invention.

FIG. 2B illustrates different cartridges and their arrangements with the fillings to make tamales, incorporating the aspects of the present invention.

FIG. 2C illustrates different pre-cooked fillings to make tamales, incorporating the aspects of the present invention.

FIG. 5A illustrates a plunging system and tamale forms, incorporating the aspects of the present invention.

FIG. 5B illustrates a plunging system pressed down to inject tamale into the tamale forms of the steamer pot, incorporating the aspects of the present invention.

FIG. 5C illustrates a tamale forms of the steamer pot, incorporating the aspects of the present invention.

FIG. 9A and FIGS. 9B and 9c illustrate the pre-cooked corn dough and the meat or cheese mixture respectively.

FIG. 10A illustrates a side view of the steamer pot for cooking the tamale, incorporating the aspects of the present invention.

FIG. 10B illustrates a top view of the steamer pot for cooking the tamale, incorporating the aspects of the present invention.

FIG. 10C illustrates the parchment paper tubes, incorporating the aspects of the present invention.

FIG. 11A illustrates about a plunging system using plunger manually, incorporating the aspects of the present invention.

FIG. 11B illustrates about a plunging system using rechargeable batteries for the dispensing, incorporating the aspects of the present invention.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
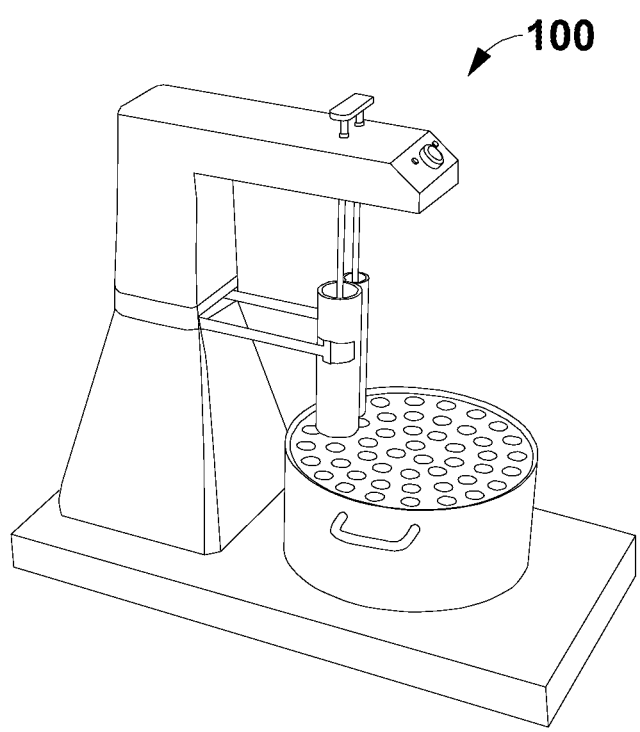
FIG. 1 illustrates a tamale preparing apparatus, incorporating the aspects of the present invention.

The present invention relates to a food processing apparatus 100 for making and cooking tamale as shown in FIG. 1. The tamale preparing apparatus 100 comprises two sets of cartridges 101 and 102, a plunging system 104, steamer forms 105, and steamer pot 106 and pot cover 107 to make and cook tamales. In one embodiment, the apparatus 100 comprises a holding 118 to hold the cartridges 101 and 102. In further description to the tamale preparing apparatus 100, there are two cartridges set 101 and 102 as shown in FIG. 2A. The ingredients for tamale are inserted into the cartridges set 101 and 102 to make tamales as shown in FIG. 2B. In one embodiment, the ingredients inserted into the cartridges could be corn dough (masa) and pre-cooked meat or cheese or veggies or any combination thereof as shown in FIG. 2C. In an embodiment, the two cartridges 101 and 102, nest together and allow the extrusion of the masa around the pre-cooked meat filling into the parchment paper tube 111. The internal cartridge 101 rests on the dead stop inside the external cartridge 102 and its nozzle extends through the external cartridge's nozzle. The masa flows under the internal cartridge 101 and around the filling nozzle. This extrusion technique creates a wall of masa dough around the center column of filling. In another embodiment, the internal cartridge 101 could be supplied with a color contrasting with the external cartridge 102 for ease of use.

In an embodiment, the internal and external cartridges 101 and 102 respectively could be injection molded food grade polypropylene plastic. The inner cartridge set 101 could be yellow in color and the outer cartridge could be blue in color to be distinct from each other. After the filling process is complete, the cartridges could be rinsed to remove most residual bulk food and placed in the commercial dishwasher for cleaning. The plastic could also be disinfected without degradation.

Figure 3:
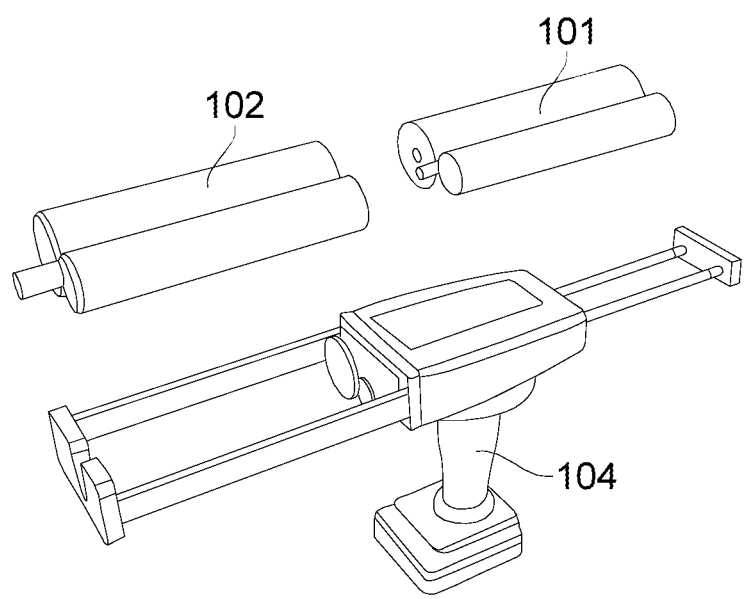
FIG. 3 illustrates a plunging system to help the fillings to go out of the cartridges, incorporating the aspects of the present invention.
Figure 4:
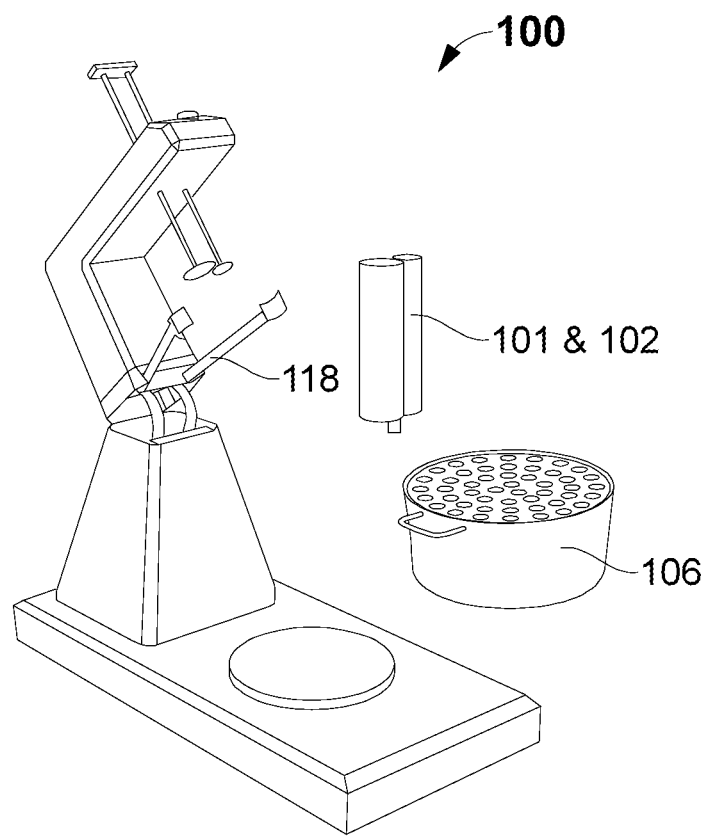
FIG. 4 illustrates an arrangement of different components of the apparatus and their installation on the base.

The plunging system or tamale gun 104 is configured to inject the shaped tamales inside the steamer pot 106 from the cartridges set 101 and 102 to be cooked as shown in FIG. 3. In an embodiment, the plunging system 104 will be loaded with the loaded cartridges 101 and 102 for extruding into steamer forms 105. In an embodiment, the plunging system 104 consists of a plunger 116 to manually extrude the tamale into the steamer forms 105. In another embodiment, the plunging system 104 could be used as an automatic tamale machine 100 for dispensing the materials into the steamer forms 105 as shown in FIG. 4. The plunger 116 of the tamale gun 104 could be used to help the plunging system 104 to dispense the materials from the cartridges 101 and 102 as shown in FIG. 5A. The tamale will be extruded to the steamer forms once the plunger 116 is pressed down as shown in FIG. 5B. In an embodiment, the plunger 116 used in the automated tamale machine 100 could be pressed down for dispensing the tamale into the steamer forms 105. In an embodiment, the steamer forms 105 could be the shapers for tamales, when the tamales are kept inside the steamer pot 106 for cooking as shown in FIG. 5C.

Figure 6:
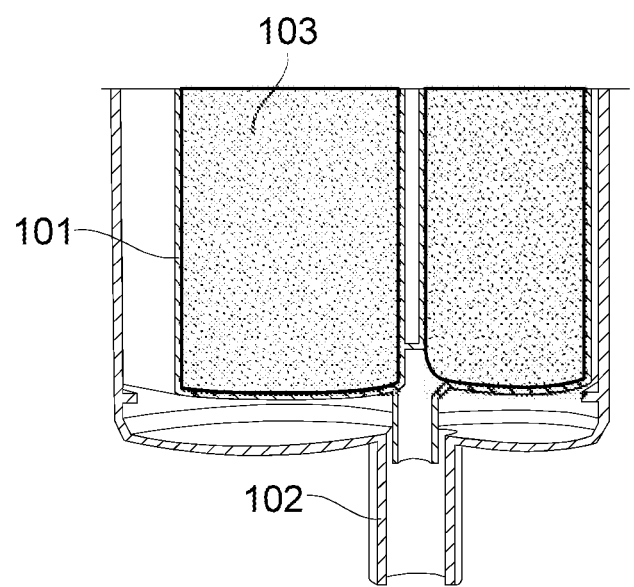
FIG. 6 illustrates a sectional view of the set of cartridges, incorporating the aspects of the present invention.
Figure 7:
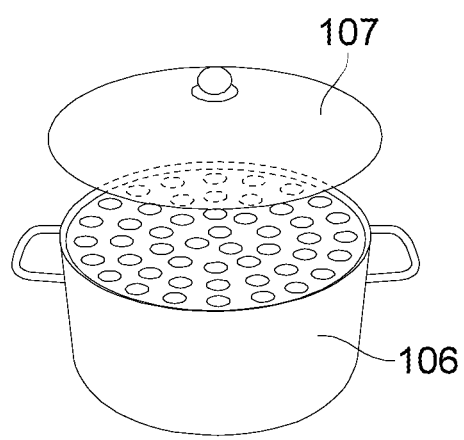
FIG. 7 illustrates a steamer pot for cooking the tamale, incorporating the aspects of the present invention.

FIG. 6 illustrates a sectional view of the set of cartridges 101 and 102, incorporating the aspects of the present invention. In an embodiment, the external blue cartridges 102 could form the masa into the shape when the plunger 116 of the plunging system 104 is pressed. In another embodiment, the plunger 116 of the plunging system 104 is pressed to form the pre-cooked meat into the shape from the internal yellow cartridges 101. A steamer pot 106 will be provided with steamer forms 105 to cook the tamales extruded from the cartridges 101 and 102 respectively. In an embodiment, the steamer pot 106 is formed of a porous top part called steamer tray 119 and could contain steamer forms 105 filled with tamales to cook, as shown in FIG. 7. The steamer pot 106 is further configured with a pot cover 107 to cover the steamer pot while cooking. In an embodiment, the steamer pot 106 is capable of cooking multiple tamales at one time. In some embodiment, the steamer pan could be type 432 stainless steel clad copper center and has a perforated lower surface that lets the steam from the mating steamer pot 106 flow up and around each of the parchment tubes 111, uniformly heating the tamales and cooking the masa. The steamer tray 119 is also perforated to allow the steam to flow up to the steamer pan and over the top of the parchment tubes 111 to steam the ends manual assembly methods.

Figures 8A, 8B:
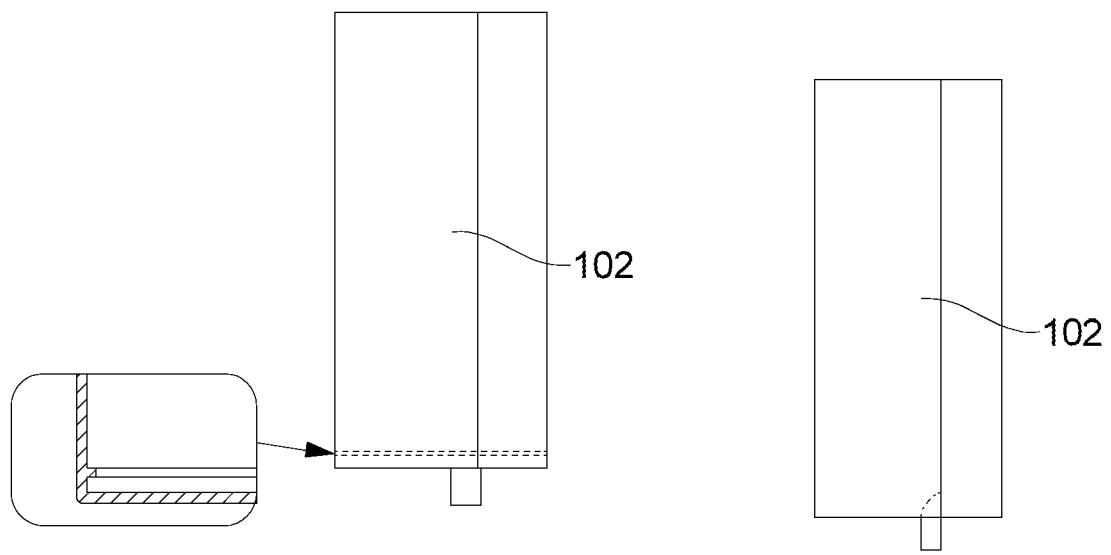
FIG. 8A and FIG. 8B illustrates a side view of the cartridges, incorporating the aspects of the present invention.

FIG. 8A and FIG. 8B illustrates a side view of the cartridges 102, incorporating the aspects of the present invention. In an embodiment, the external cartridge 102 extrudes the corn based masa to be ended up around the meat on the center of the parchment papers.

Figure 9C:
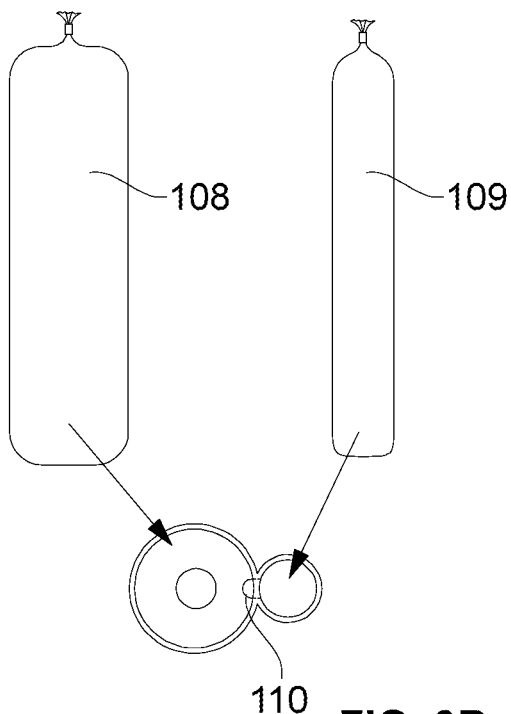
Figure 9C:
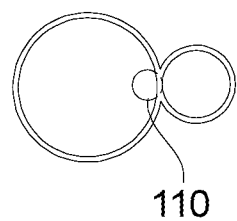

FIG. 9A and FIG. 9B FIG. 9C illustrates about the pre-cooked corn dough (Masa) and the meat or cheese mixture respectively. In an embodiment as shown in FIG. 9C, the larger opening for the masa allows the smaller filling nozzle to fit inside the masa when extruded. In an embodiment, the masa dough could be adjusted in consistency to allow uniform extrusion without becoming sticky and too fluid. In further embodiment, the masa dough is pre-made in a commercial kitchen and then loaded into masa tubes 108 with sealing, and refrigerated until use. In further embodiment, the spicy meat or cheese mixture is also pre-made in a commercial kitchen, loaded in the filling tubes 109 and is supplied in a consistency that insures optimum extrusion. In another embodiment, the masa tubes 108 and the filling tubes 109 could be supplied in premixed or pre-cooked materials in 2.5 mil food grade polyamide plastic film tubes. The masa tubes 108 could be larger in diameter than the filling tubes 109.

In yet another embodiment, the standard tamale could be made using this mechanized system is approximately 1" inch in diameter with ⅝" inch seasoned meat or cheese at center. The volume of the tubes 108 and 109, and cartridge volume could be further optimized to balance the extrusion characteristics against the tube volume, so the tubes empty at the same time, reducing waste. In further embodiment, the internal cartridge 101 could be filled with masa and the pre-cooked meat filling made in the restaurant could be spooned into the internal cartridge 101 for extrusion. The plunger plates 114 would fit snugly within the internal cartridge 101 and will extrude the inside spooned material with little loss around the plunger plate 114. In another embodiment, wiper caps could be made available with this arrangement to prevent any loss around the plunger plate 114.

FIG. 10A illustrates a side view of the steamer pot 106 for cooking the tamale, incorporating the aspects of the present invention. In an embodiment, the steamer pot 106 consists of a pot cover 107 to use while cooking tamales. In an embodiment, the steamer tray 119 of the steamer pot 106 is configured as a perforated part and contains steamer forms 105, as shown in FIG. 10B. In some embodiment, the steamer tray 119 could hold about 50 parchment paper tubes 111 and is able to withstand steam temperatures without degradation. The steamer tray 119 could be injection molded using food grade polypropylene plastic. The steamer tray 119 fits down into the steamer pan. The walls of the steamer tray 119 could be about 0.100" thick to transfer heat quickly from the steam to tamale ingredients to cook them rapidly. The steamer tray 119 is also perforated in few places to allow the steam to flow through and cook the open end of the tamale directly, imparting the flavor associated with the manual tamale cooking process.

In an embodiment, the steamer pot 106 has a perforated base so the steam from the boiling water inside) could contact the walls of the insert heating the tamale ingredients and cooking them uniformly. In another embodiment, the pre-formed parchment paper tubes 111 could be robotically shaped with the lower end turned under to prevent outflow during the extrusion process, as shown in FIG. 10C. In yet another embodiment, the parchment paper tubes 111 could be of food grade silicone treated paper and robotically formed into closed end tubes of 1" diameter by 5" long. The parchment paper tubes 111 could fit loosely in the perforated steamer tray 119 of the steamer pot 106 and could be removed at the table by the guest just prior to consuming the tamales. In some embodiments, the parchment paper tubes 111 could be used in place of the corn husks and could be sold to the restaurant by the normal paper goods supplier. The parchment paper tubes 111 could be steamed and retain its shape, making it as a good replacement for the corn husks. In another embodiment, the steamer tray 119 of the steamer pot 106 could accept the per-formed parchment paper tubes 111, which are then filled with machine extruded tamale component. In some embodiments, all the food grade components that come into contact with the edible ingredients could be machine washable in commercial dishwashers.

As shown in FIG. 11A, a plunging system 104 could use plunger 116 manually. In an embodiment, the internal and external cartridges filled with the poly tubes of masa and meat and could be placed in the retention end of the tamale gun 104. The end is supported with stainless steel support rods 113. Further, stainless steel support rods 113 are adhesively bonded in the plunger plate 114 and gun receiver 115. The gun receiver 115 consists of the solenoid driver that moves both the plunger rods 120 simultaneously, keeping the plunger rods 120 parallel. The masa and filling are dispensed using the trigger operated solenoid driver that advances the plunger plates 114 into the cartridges 101 and 102. The solenoid driver could extend strongly driving the pawl up the ramp where it engages with the notches milled into the lower part of the plunger rods 120. In an embodiment, 2 to 3 trigger pulls could fill up one tamale tube on the perforated steamer tray 119 of the steamer pot 106. In another embodiment, the plungers 116 could be operated manually when the battery is discharged or the chef simply wants to make a few by hand. In yet another embodiment, the plunger rods 120 could use a 'pawl drive', which engages the plunger rods 120 and forces them into the cartridges 101 and 102, pushing the bulk food into the dispensing nozzles. The plunger plates 114 could be unbolted and the plunger rods 120 removed from the tamale gun 104 during cleaning. The solenoid pawl drive could be operated using the microcontroller operated driver, which engages every time the trigger is pulled. The drive forces the plunger rods 120 ahead smoothly and in a controlled fashion, giving the bulk food materials time to flow without compacting. This makes an optimum form of tamale within the parchment paper tube 111.

In an embodiment, the tamale gun 104 could be molded using food grade polycarbonate plastic. Several sections could be used and held together using stainless steel fasteners to make the tamale gun 104. The retention end of the tamale gun 104 could hold the cartridges 101 and 102. So, the cartridges 101 and 102 do not move around during the extrusion process. The retention end is attached to the body of the tamale gun 104 using type 432 stainless steel support rods 113. The support rods 113 are pinned in place in the gun housing and are pinned and adhesively bonded in place in the retention end. The plunger rods 120 could hold the food grade plastic plunger plates 114 that are bolted to the rods. These plunger plates 114 compress the plastic film on the bulk food tubes and force it out of the extrusion nozzles. The upper end of the food grade stainless steel plunger rods 120 are terminated with the manual operation plunger plate 114, which are pinned and adhesively bonded in place. In yet another embodiment, rechargeable Li-Ion battery and a smart charger could be supplied to accept and recharge the batteries as shown in the FIG. 11B. The charger could be a 2 bay unit that plugs into the restaurant's 120 VAC mains. Further, the appliance could be supplied with 2 batteries, so one can be in use while the other is being recharged. All of the components used could be washed, rinsed, and disinfected before the next tamale assembly process. In further embodiment, the battery could be an 18V Li-Ion rechargeable unit that snaps into the base of the handle. The battery is capable of filling multiple steamer trays 119 without becoming fully discharged. The system could be supplied with 2 batteries and a smart charger that allows both the batteries to remain in the charger between uses and follows a charging algorithm that enhances the overall battery life while keeping them fully charged.

The tamale preparing device 100 is an innovative and unique solution to the production of tamales for restaurants or home cooks by reducing the time and effort in producing tamales in large batches. In an embodiment, the tamale preparing device 100 could be either a manual or an automatic electrically operated device. The tamale preparing device 100 provides pre-cooked masa (corn dough) and meat in sausage like packs that are designed to fit the cartridges 101 and 102, which fit the device. The packs come in a variety of flavors and meat combinations for an assortment of flavor mixtures. The packs are pre-measured to fit exactly into the cartridge. Once the packs are installed into the inner cartridge, it slides into the outer cartridge. The combination is used to create the tamale with the utilization of the manual or automatic electric plungers 116. In the steamer forms 105, the parchment paper 111 or corn husks that serve as wraps to hold the tamales shape for serving are placed. The loaded tamale gun 104 or automatic machine plunger is pressed to extrude the tamale. The design of the cartridges 101 and 102 extrudes the masa and meat mixture to form the whole tamale. In an embodiment, the tamale preparing device 100, could perform some unique functions. The device 100 could make producing tamales cost-effective. It could use pre-cooked dough and meat packs and variety of flavors and food combinations to prepare tamale and cook. In an embodiment, the tamale preparing device 100 could use blades in inner cartridge pierce the two different packs for extrusion. The tamale preparing device 100 could be available in both electric and manual models. High-quality tamales, and other food combinations in quantity could be produced using the tamale preparing device 100. Multiple tamales could be created with one cartridge load and steamer pot 106 could cook many units at once.

Preferred embodiments of this invention are described herein, including the best mode known to the inventors for carrying out the invention. It should be understood that the illustrated embodiments are exemplary only, and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A tamale machine comprising:
    an external cartridge having a pair of segregated compartments and a first dispensing nozzle;
    an internal cartridge received within said external cartridge, said internal cartridge having a masa compartment and a segregated, juxtaposed ingredient compartment, said masa compartment and said ingredient compartment dimensioned to be received within one of the segregated compartments of said external cartridge;
    said internal cartridge further having a second dispensing nozzle in communication with said ingredient compartment and received within said first dispensing nozzle;
    a plunger having a first plate received within said masa compartment and a second plate received within said ingredient compartment whereby downward movement of said first plate and said second plate forces masa out of said masa compartment and around said second dispensing nozzle, and an ingredient out said second nozzle and said first nozzle where said ingredient is encapsulated by said masa to form a tamale;
    a steamer pot including a hollow container having an open upper end and an interior chamber;
    a steaming tray positioned within the open upper end of said hollow container, said steaming tray having a plurality of steamer forms thereon;
    a tamale tube received within each of said steamer forms for receiving the tamale dispensed by said first nozzle and said second nozzle.

2. The tamale machine according to claim 1, wherein the steamer pot further includes a perforated base for receiving steam from a steaming pan.

3. The tamale machine according to claim 1 further comprising:
    a plunger rod extending from each of said plunger plates;
    a handle attached to said plunger rods that may be grasped by a user to lower said plates.

4. The tamale machine according to claim 3 further comprising:
    a trigger operatively connected to a solenoid driver;
    a pawl operated by said solenoid driver and engaging a notch on said plunger rod whereby depressing said trigger automatically raises or lowers said plates.

5. The tamale machine according to claim 4 wherein said solenoid driver is powered by a battery pack removably attached to a casing containing said solenoid driver.

6. The tamale machine according to claim 1 wherein said external cartridge has a stop member for positioning said internal cartridge therein at a select location.

7. The tamale machine according to claim 1 wherein said internal cartridge and said external cartridge each have a discrete color to allow a user to identify said external cartridge and said internal cartridge.

8. The tamale machine according to claim 1 further comprising a cover superimposeable on the open upper end of said hollow container.

* * * * *